Oct. 8, 1935.    J. L. SPENCE, JR    2,016,656
FILM DRIVING MEANS FOR SOUND RECORDING CAMERAS
Filed June 1, 1931    2 Sheets-Sheet 1
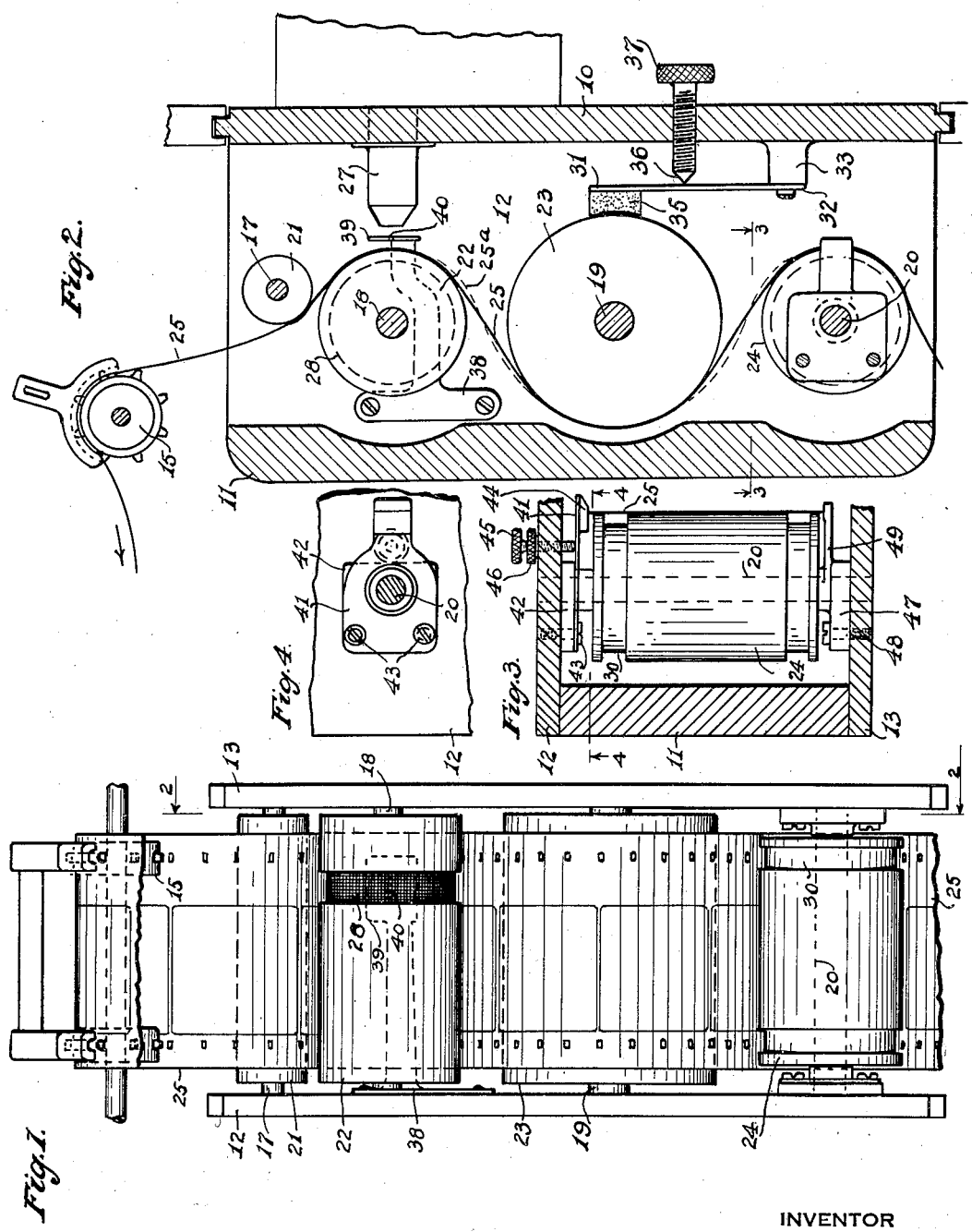
INVENTOR
John L. Spence Jr.
BY
Harold D. Penney, ATTORNEY.

Oct. 8, 1935.   J. L. SPENCE, JR   2,016,656
FILM DRIVING MEANS FOR SOUND RECORDING CAMERAS
Filed June 1, 1931   2 Sheets-Sheet 2
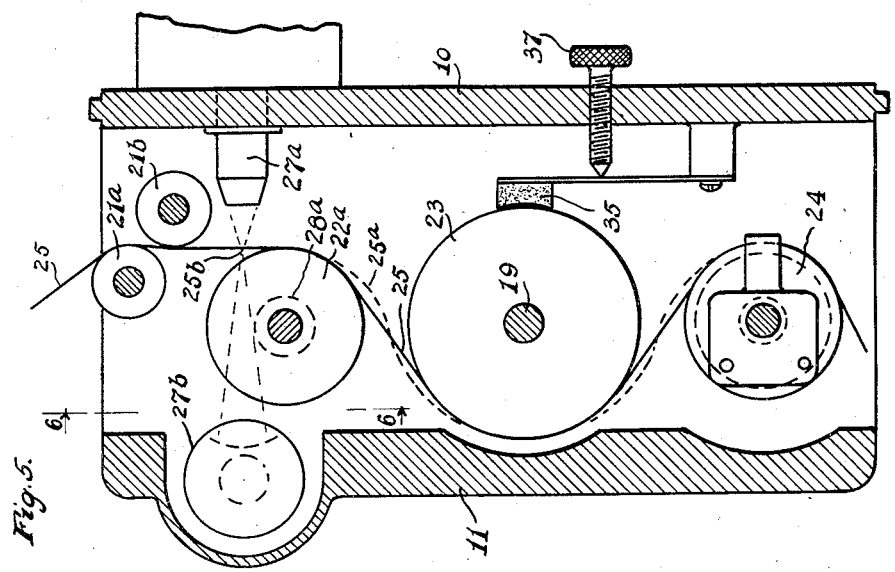
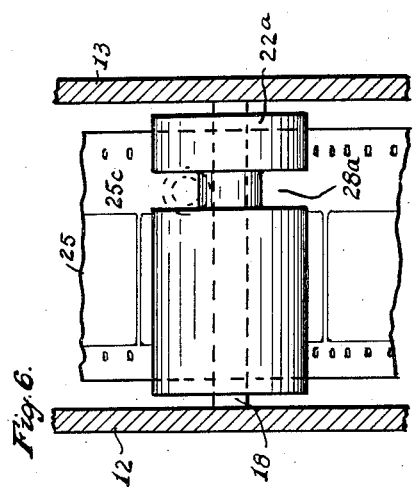
INVENTOR
John L. Spence Jr.
BY
Harold D. Penney, ATTORNEY.

Patented Oct. 8, 1935

2,016,656

UNITED STATES PATENT OFFICE 2,016,656

FILM DRIVING MEANS FOR SOUND RECORDING CAMERAS

John L. Spence, Jr., New York, N. Y., assignor, by mesne assignments, to Remac Patents Corporation, New York, N. Y., a corporation of New York Application June 1, 1931, Serial No. 541,394

17 Claims. (Cl. 271—2.3)

This invention relates to mechanisms for feeding sound record films and more particularly to means for feeding perforated sound films such as are used in motion picture machines, though it is noted that the invention is not limited to picture machines nor in some respects to perforated film feed.

Owing to change in the film length due to shrinkage and to the imperfections and wear of the sprocket holes, it has heretofore not been possible in all cases, by the use of a sprocket, to cause the film to run true for recording and reproducing sound.

The object of the invention is to provide a feed mechanism which will overcome this defect.

Other objects of the invention are to provide an apparatus of this kind which takes advantage of the slight bending elasticity of the film by the use of a slight drag set up in turning a series of rolls to which might be added the drag occasioned by a side pressure used to guide the film.

Other objects of the invention are to provide for an easily removable unit through which the film passes during the recording or reproducing process which contains not only the rollers and necessary film guiding means, but the elements necessary in recording or reproducing, i. e. the flashing lamp and its optics or a photoelectric cell and exciting lamp, etc. By having these units removable as a whole, positive insurance is had that the unit is in perfect focus at all times. Out-of-focus recording is exceptionally detrimental to quality.

Still other objects of the invention are to improve generally the simplicity and efficiency of such apparatus and to provide apparatus of this kind which is economical, durable and reliable in operation, and economical to manufacture.

And still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with a sound feed unit which, briefly stated, includes a driven sprocket mounted to draw film sinuously through a series of peripherally smooth rollers rotatable entirely independently of each other and the sprocket.

A light element is mounted to direct its beam against the record portion of the film on or near one of the intermediate rollers, adjacent rollers being further apart than the thickness of the film to prevent gripping the film, but sufficiently close to cause the rollers to rotate by the friction of the film.

An adjustable friction means engages at least one of the rollers; and said friction means and the shafts of the rollers exert sufficient drag on the rollers and film to cause the film to move with uniform motion past the light element.

A second adjustable friction means which engages the edge of the film and also causes the film to be firmly guided laterally, may be used if desired, in order to vary the film drag.

In the accompanying drawings showing, by way of example, two of many possible embodiments of the invention, Fig. 1 is a rear elevation of the unit, the rear wall being removed;

Fig. 2 is a fragmental sectional view, partly in elevation, taken on the line 2—2 of Fig. 1;

Fig. 3 is a fragmental sectional view taken on the line 3—3 of Fig. 2, looking in the direction of the arrows;

Fig. 4 is a detail, fragmented view taken on the line 4—4 of Fig. 3, looking in the direction of the arrows;

Fig. 5 is a vertical section, transverse to the roller shafts showing another form of the invention; and Fig. 6 shows a fragmented section taken on the line 6—6 of Fig. 5.

My invention is shown embodied in a removable sound feed unit comprising a housing having outer and inner walls or portions 10, 11 and side walls or portions 12, 13 disposed under the driven feed sprocket 15 adapted to draw film through the unit. A plurality of stationary shafts 17, 18, 19, 20 passing through the side walls, substantially one above the other parallel to the axis of the feed sprocket, carry friction rollers 21, 22, 23, 24 which, having bores therein, as shown, are rotatable on said shafts respectively. The film 25 passes sinuously past said sprocket and rollers, and is successively engaged thereby alternately on opposite faces of the film. The rollers 28 and 24 are herein identified as supporting rollers; the device 17 as a pressure roll, and the roller 23 as a control roller.

A light emitting recording element 27 mounted on said outer wall 10 is adapted to direct its beam against the sound record portion of the film when it is opposite said element on the friction roller 22, said roller 22 having therearound a flat bottomed shallow annular recess 28 (Fig. 1) registerable with the record portion, the bottom and wall of the recess being blackened to avoid halation.

The other rollers 21, 23, 24 have therearound shallow annular recesses 30 registerable with the sprocket holes of the film to prevent uneven friction on the perforated portion of the film. The peripheries of all of the rollers are substantially cylindrical and have entirely smooth film engaging peripheral surfaces, adjacent rollers being further apart than the thickness of the film to prevent gripping the film by the rollers and to prevent breakage on starting. But adjacent rollers are close enough together, and the surface engaged is sufficiently extensive to exert sufficient friction on the film to rotate the rollers.

A flat spring 31, 32 having its inner end 32 mounted on a lug 33 on the front wall 10 carries a block 35 of felt on the free end 31, the felt engaging the periphery of one of said rollers, for instance, the roller 23; and an adjusting screw 36 mounted in the front wall engages the spring and has an exterior head 37 for adjusting pressure of the felt on the roller. This arrangement provides for adjusting the tension, or friction, on roll 23 during the running of the recording apparatus, without exposing the running, sensitive, film to light or stopping the machine. Also, the proper tension may be adjustably set during movement of the film through the reproducing apparatus, without opening it, thus to accomplish another of the before noted improvements. While I show only one of the rollers engaged by a felt block, rather than two or more, the invention is not thus limited.

The shafts 17 to 20 are relatively large, and are large enough to exert sufficient friction and drag on the rollers and film, in conjunction with the friction of the felt block 35 to cause the film to move with uniform motion past the light element, the variations and jerks in the film caused by shrinkage and uneven sprocket engagement being absorbed by the elasticity of the film and practically obliterated.

A bracket plate 38 mounted on a wall of the housing is provided with a diaphragm portion 39 having a slit 40 between the light element 27 and the record portion of the film preventing stray light in the optical system from reaching the film.

The elasticity of the film causes the film in use to take the somewhat curved path shown by the dotted lines 25a; and this is true even though the rolls exert a drag tending to hold back the film. Jerks on the film tend momentarily to overcome the elasticity of the film and straighten out the film between rolls 22, 23, 24 as shown by the full lines.

By means of the above mentioned drag on the film due to the energy required to rotate the rollers 21, 22, 23, and 24, advantage is taken of this elasticity of the film to take up the small jerks of the sprocket teeth as they move into engagement in the sprocket holes, thus smoothing out the jerks as the film passes the element 27.

It is of course understood that friction means may be applied to any or all of the rollers but practice apparently proves that sufficient drag is obtainable by using comparatively large shaft sizes for the shafts on which the rollers rotate.

In Fig. 3 there is disclosed a side pressure resilient member 41 which is mounted upon a block 42, said member 41 and block 42 being suitably secured to the wall 12 by any desired means such as screws 43. The free end of said member 41 is provided with a tip 44 which is preferably made of steel, though it may be made of any other suitable material. Said tip 44 frictionally engages the edge of the film 25 in order to laterally guide the same. A screw 45, which is provided with a locking nut 46, is mounted in the wall and contacts with the resilient member 41 for the purpose of regulating the pressure of the tip 44 against the edge of the film 25.

In order to guide the other edge of the film, the hub 47, which is secured to the wall 13 by a screw or screws 48, is provided with an upwardly extending arm 49 which contacts near its free end with the edge of the film, as shown in Fig. 3. Said hub, and the hub or block 42, engage the short roller 24, to prevent endwise movement thereof.

In Figs. 5 and 6 is shown an arrangement similar to that of Fig. 1, but in which the light emitting element 27a directs its beam to a substantially flat portion 25b of the film remote from the curved surface of the roller 22a and held straight by the coaction of rolls 21a, 21b, and 22a. While Fig. 6 shows the light beam passing through the sound record portion 25c of the film to control the photoelectric cell 27b, rather than to make the record as in Fig. 2 this feature of the invention is not necessarily limited either to light control or recording.

In this case, the roller 22a is provided with a very deep groove 28a which affords passage from the element 27a to the cell 27b.

While herein, light emitting means for sound records on the film are shown, rather than light emitting or directing means for projecting or recording pictures, it is understood that the invention is not limited to sound recording, the structures and advantages being also suitable for continuous-feed motion picture taking and projecting, and the structure may be adapted therefor if desired without departing from the spirit and scope of the invention.

I claim as my invention:

1. A control mechanism for a movable film comprising in combination a housing having shafts rigid therewith, spaced supporting rollers mounted on two of said shafts for urging parts of a film in one direction, another roller mounted on another of said shafts and spaced from said first rollers for urging another part of a film in the opposite direction, and yieldable control means engaging the periphery of said second roller.

2. A control mechanism for a motion picture film comprising in combination a housing having a pair of shafts rigid therewith, another shaft rigidly carried by said housing and disposed in the plane of said first shafts, supporting rollers mounted on said first shafts for urging parts of a film in one direction, another roller mounted on said second shaft and spaced from said first rollers for urging an interposed portion of a film in the opposite direction, control means adjustably engaging the periphery of said second roller, and manipulable means carried by said housing for adjusting said first means.

3. A control mechanism for a movable film comprising in combination a housing having shafts rigid therewith, spaced supporting rollers mounted on two of said shafts for urging parts of a film in one direction, another roller mounted on another of said shafts and spaced from said first rollers for urging another part of a film in the opposite direction, a pressure roll for also engaging a film adjacent one of said supporting rollers, and yieldable control means engaging the periphery of said second roller.

4. In a film moving apparatus having a structure having apertures therein and a sprocket for moving said structure, the teeth of the sprocket being engageable in said apertures; a housing for said structure at the sprocket, shafts having their opposite ends rigid with said housing, spaced supporting rollers mounted on two of said shafts for urging said structure in one direction, another roller mounted on another of said shafts and spaced from said first rollers to urge said structure in the opposite direction, said second roller being disposed between said first rollers, which latter together with said first roller are revolvable by said structure, and means resiliently engaging said second roller for limitedly arresting its revolution to render movement of said structure uniform during engagement of said teeth in said apertures.

5. In a film moving apparatus having a film having apertures therein and a sprocket for moving said film, the teeth of the sprocket being engageable in said apertures; a housing for said film at said sprocket, pairs of shafts rigidly carried by the housing and disposed within said housing, spaced supporting rollers mounted on one pair of said shafts for urging said film in one direction, rollers mounted on another pair of said shafts for urging said film in the opposite direction, said second rollers being spaced from said first rollers, which latter together with said second rollers are revolvable by said film, and means resiliently engaging one of said second rollers for limitedly arresting the revolution thereof to render movement of said film uniform during engagement of said teeth in said apertures.

6. A control mechanism for a motion picture film comprising a housing having a pair of shafts therein, another shaft positioned within said housing and disposed in the plane of said first shafts, supporting rollers mounted on said first shafts for urging parts of said film in one direction, one of said rollers having a blackened annular recess therein, another roller mounted on said second shaft and spaced from said first rollers for urging an interposed part of a film in the opposite direction, control means adjustably engaging said second roller, and manipulable means carried by said housing for adjusting said first means whereby to regulate movement of said film, said rollers being revolvable by said film.

7. A device according to claim 4 in which the rollers of the structure claimed are provided with annular recesses opposite the respective lines of sprocket apertures to prevent friction thereat.

8. In a film operating mechanism comprising opposed walls and having on one of the latter a fixed guide for one edge of a film, adjustable means for guiding the opposite edge of the film to cooperate with said first guide, said means including a flat spring carried by the other wall and having a tip disposed adjacent the last mentioned edge of said film, and manipulable means threadedly mounted in said latter wall and terminally engaging said spring for urging the same to move said tip into or out of engagement with said adjacent edge.

9. In combination with mechanism for feeding a film, said mechanism including a revolvable sprocket, and there being apertures in said film for receiving the teeth of the sprocket, a housing having therein fixed shafts, film supporting rollers carried on two of said shafts for urging a film in one direction, one of said rollers including plain flush surface portions, an annular surface portion disposed below said first portions whereby to space a continuous line or strip of said film from said roller, another roller disposed on another of said shafts between said first rollers and spaced from the latter for urging the film in the opposite direction, said rollers being revolvable by said film, and means carried by said housing and yieldably engaging said last mentioned roller whereby to render movement of said film uniform during engagement of said teeth in said apertures.

10. In combination with film drive means and film control means, including a housing wherein the film is movable; a shaft rigid with said housing, a hollow roller mounted on said shaft, means disposed on opposite sides of said roller and engaging the film so as to urge the latter into driving relation with one portion of said roller, resilient means frictionally engaging the opposite portion of said roller, and adjustable means cooperating with said resilient means and including an externally disposed terminal, whereby to vary the friction against said roller.

11. In combination, with film drive means and film control means including a housing wherein the film is movable; a shaft rigid with said housing, a hollow roller mounted on said shaft, means disposed on opposite sides of said roller and engaging the film so as to urge the latter into driving relation with one portion of said roller, a spring carried at one of its ends by said housing and having at its opposite end a block of felt which engages the opposite portion of said roller, means adjustably mounted in the wall of said housing and having one end engaging said spring, and external manipulable means rigid with the opposite end of said adjustable means.

12. In combination, with a film feeding mechanism and a housing wherein the film is movable; a shaft rigid with said housing and having a hollow roller thereon, means disposed on opposite sides of said roller for guiding the film sinuously to urge the latter into driving engagement with one portion of the periphery of said roller, and an adjustable brake engaging the opposite portion of said periphery and having manipulable means external to said housing.

13. In combination with film drive means and film control means including a housing; shafts rigid with the walls of said housing, rollers mounted on said shafts and with which the film sinuously engages; said rollers including members having their opposite ends extending laterally at least as far as the opposite edges of said film, another member having its ends disposed inside of the plane of said edges, and guide means carried by said walls and engaging said edges at the last mentioned ends.

14. In a film feeding mechanism, in combination, a housing including opposed walls, spaced rollers carried by said walls and with which the film is engageable, said rollers having their opposite ends extending laterally at least as far as the opposite edges of the film, another roller carried by said wall and having its opposite ends disposed inside of and adjacent the planes of said edges, guide means carried by said walls and engaging said edges at the last mentioned ends, and means for adjusting said guide means edgewise of said film.

15. The combination of rotary film drive means, an elongate housing having one end adjacent said means and through which the film passes, a roller disposed at the opposite end of said housing and having opposite ends disposed inside of and adjacent the planes of the edges of the film, guiding means carried by said housing and engaging said edges at said ends in guiding relation, rollers disposed within said housing between the first mentioned roller and the first mentioned end, whereby to guide the film sinuously and means for adjusting said guiding means.

16. In a film feeding mechanism, the combination of a roller having its opposite end surfaces disposed between the planes of the edges of the film, guide means engaging said edges, and means engaging said surfaces to prevent the latter from moving outside of said planes.

17. The combination of rotary film drive means, an elongate housing having one end disposed adjacent said means and through which the film passes, means disposed within the housing and engageable with opposite faces of the film to guide the latter sinuously; and controllable means carried by the housing for guiding the film laterally; said latter means including flexible members which are engageable with the opposite edges of the film, and manually adjustable elements engaging said respective members.

JOHN L. SPENCE, Jr.